US007107527B2

(12) United States Patent
Takahashi et al.

(10) Patent No.: US 7,107,527 B2
(45) Date of Patent: Sep. 12, 2006

(54) METHOD AND SYSTEM FOR MANAGEMENT OF STRUCTURED DOCUMENT AND MEDIUM HAVING PROCESSING PROGRAM THEREFOR

(75) Inventors: Toru Takahashi, Sagamihara (JP); Noriyuki Yamasaki, Yokohama (JP); Yoshifumi Sato, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/834,044

(22) Filed: Apr. 29, 2004

(65) Prior Publication Data

US 2004/0205598 A1 Oct. 14, 2004

Related U.S. Application Data

(63) Continuation of application No. 09/461,192, filed on Dec. 15, 1999, now abandoned.

(30) Foreign Application Priority Data

Dec. 18, 1998 (JP) ................................ 10-360110

(51) Int. Cl.
*G06F 15/00* (2006.01)
*G06F 17/00* (2006.01)

(52) U.S. Cl. ...................... 715/530; 715/511; 715/512; 715/513; 715/514; 715/515; 715/501.1

(58) Field of Classification Search ........ 715/511–515, 715/530, 501.1
See application file for complete search history.

(56) References Cited

U.S. PATENT DOCUMENTS

| | | | |
|---|---|---|---|
| 5,185,698 A | 2/1993 | Hesse et al. | |
| 5,706,502 A | 1/1998 | Foley et al. | |
| 5,903,902 A | 5/1999 | Orr et al. | |
| 6,061,697 A | 5/2000 | Nakao | |
| 6,199,082 B1 | 3/2001 | Ferrel et al. | |
| 6,321,242 B1 | 11/2001 | Fogg et al. | |
| 6,470,364 B1 * | 10/2002 | Prinzing | 715/530 |

FOREIGN PATENT DOCUMENTS

| | | |
|---|---|---|
| JP | A-8-44718 | 2/1996 |
| JP | A-9-223054 | 8/1997 |

OTHER PUBLICATIONS

Atzeni et al., Semistructured and structured data in the Web: going back and forth, ACM SIGMOD Record, Dec. 1997, vol. 26, Issue 4, pp. 16-23.*

* cited by examiner

*Primary Examiner*—William Bashore
(74) *Attorney, Agent, or Firm*—Mattingly, Stanger, Malur & Brundidge, P.C.

(57) ABSTRACT

In a structured document managing method and system for managing a structured document formed by a plurality of elements, any file forming a registered document is selected as an object of updating from relationship data indicating an entity structure and a logical structure of the registered document and the data content of the selected update object file is updated. There is generated partial relationship data which indicates an entity structure and a logical structure of the update object file after updating. Relationship data of the registered document is updated by use of the generated partial relationship data. Thereby, a logical structure and an entity structure possessed by a document are managed in association with each other in a mutually convertible form.

4 Claims, 15 Drawing Sheets

702

| ENTITY TYPE | ENTITY NAME | ENTITY IDENTIFIER | RESOURCE NAME | |
|---|---|---|---|---|
| DOC | -- | E0001 | doc.sgm | 801 |
| TEXT | part1 | E0002 | part1.sgm | 802 |
| TEXT | note | E0003 | note.sgm | 803 |
| NDATA | Fig1 | E0004 | fig1.bmp | 804 |

FIG. 7

| EVENT TYPE | PARAMETER |
|---|---|
| STAG | type="doc" |
| STAG | type="doc-t" |
| PCDATA | text="DOCUMENT RETRIEVAL TECHNIQUE" |
| ETAG | type="doc-t" |
| EREF | ent="part1" |
| STAG | type="sec" |
| STAG | type="sec-t" |
| PCDATA | text="KEYWORD RETRIEVAL" |
| ETAG | type="sec-t" |
| STAG | type="p" |
| PCDATA | text="Documents matching with prepared···" |
| ETAG | type="p" |
| | |
| ETAG | type="sec" |
| STAG | type="sec" |
| STAG | type="sec-t" |
| PCDATA | text="FULL-TEXT RETRIEVAL" |
| ETAG | type="sec-t" |
| STAG | type="p" |
| PCDATA | text="Full-text retrieval herein referred to···" |
| ETAG | type="p" |
| EREF | ent="note" |
| STAG | type="note" |
| PCDATA | text="As to whole of full-text retrieval···" |
| ETAG | type="note" |
| EE | |
| ETAG | type="sec" |
| EE | |
| | |
| ITAG | type="fig" attr-entity="Fig1" |
| EREF | ent="note" |
| STAG | type="note" |
| PCDATA | text="As to whole of full-text retrieval···" |
| ETAG | type="note" |
| EE | |
| ETAG | type="doc" |

METHOD AND SYSTEM FOR MANAGEMENT OF STRUCTURED DOCUMENT AND MEDIUM HAVING PROCESSING PROGRAM THEREFOR

This application is a continuation of U.S. patent application Ser. No. 09/461,192, filed Dec. 15, 1999 now abandoned, which is incorporated by reference herein in its entirety.

BACKGROUND OF THE INVENTION

The present invention relates to a structured document managing method and system in which electronized document data is managed by use of a computer, and more particularly to a technique effective in the application thereof to a structured document managing system in which a structured document is managed with a logical structure of the document and an entity construction (or entity structure) thereof associated with each other.

The real progress of the information society has brought about the very energetic increase in amount of electronized document data generated by use of word processors, personal computers or the like. There are desired not only the mere generation or creation of various kinds of documents by a computer for use thereof for display or printout but also the realization of the great improvement in working efficiency by electronically generating documents which play an important part in the work of an organization (or mission critical documents) and electronizing the whole of a work which handles these documents.

Such a mission critical document may be made the object of various processings which include not only the mere display/printout but also the extraction of data from the document, the generation of a derived document, the reuse with a changed display style, and so forth. In many cases, therefore, the mission critical document is generated, by use of a document markup language such as SGML (Standard Generalized Markup Language), XML (eXtensible Markup Language), HTML (Hyper Text Markup Language) or the like, as structured document data which are capable of being easily subjected to mechanical processing. Accordingly, a structured document managing system handling those mission critical documents has need to have a function of storing and managing a structured document to perform the reference to structure information, the edition/revision of the content of the document, the management of a version history.

The structured document described by the above-mentioned document markup language has a double structure which includes an entity structure and a logical structure. The logical structure is a structure which includes the order of arrangement of individual logical elements (chapters, sections, paragraphs and others) forming a document and a mutual inclusion relationship between the logical elements. According to the document markup language, the logical structure of a document is represented in such a manner that a "tag" as a character string indicating the type of each logical element (or an element type) is arranged at each of the head and tail of that element. The entity structure is a structure represented in such a manner that document data is divided into units called "entities" and the reference to another entity is described in the content text. Namely, the entity structure includes a call relationship between entities.

In the case where a document becomes so long that it is inadequate to maintain the document as a single continuous text, there is generally performed the management which includes, for example, dividing the document into a plurality of entities so that the respective entities are assigned to persons in charge of writing/edition. Also, data such as graphic data is handled as a separate entity since it is described in a data format peculiar to each of various processing programs and is therefore incapable of co-existence with a text composed of content character strings and tags. In the case where a document is formed by a plurality of entities, it is general that each entity is stored in one file. Tags used for identifying elements in a structured document, entity reference describing the reference to an entity, and character strings describing comments or the like are generically termed marks.

FIG. 15 is a diagram showing an example of the conventional structured document described by a document markup language SGML. The entity structure of a single SGML document is composed of one entity corresponding to a body of the document (or a document entity) and zero or one or more external entities to which the reference is made directly or indirectly from the document entity.

The external entity includes a text entity described as an SGML text in a manner similar to the document entity, and a non-SGML data entity such as graphic data. (In the present specification, the document entity and the external entity are merely called entity in a general term.) In the case of the document shown in FIG. 15 by way of example, a document entity 101 has the reference to text entities 102 and 103 and a non-SGML data entity 104 therefrom. Also, the text entity 102 includes the reference to the text entity 103 therefrom. As a result, the text entity 103 having the reference from both the document entity 101 and the text entity 102 is shared between the document entity 101 and the text entity 102.

FIG. 16 is a diagram showing an example of a logical structure obtained through the analysis of the conventional SGML document shown in FIG. 15. As shown in FIG. 16, a logical structure possessed by the SGML document can be represented as a tree structure which has elements and data contents as nodes.

In FIG. 16, an elliptic node represents an element and a rectangular node represents data content (parsed character string data or non-SGML data). Also, an area enclosed by dotted line in FIG. 16 represents a set of nodes. A node set 201 corresponds to the document entity 101, a node set 202 corresponds to the text entity 102, node sets 203 and 204 correspond to the text entity 103, and a node set 205 corresponds to the data entity 104. As shown by the relationship between the entities and the node sets, the content of an entity called by the entity reference or an entity to be referred to is developed at a called position and a developed text or a text obtained as the result of development is subjected to syntax analysis, thereby obtaining the logical structure of the SGML document.

In a typical example of the conventional technique, document data is stored in files and is managed on a file system. According to an invention disclosed by JP-A-9-223054 (hereinafter referred to as prior art 1), the reading of files from storage means, the storage of files into the storage means and a version management are realized in units of a file set including a plurality of files. Though the invention of the prior art 1 primarily aims at the management of file groups forming computer programs, the disclosed file management function can also be used for the purpose of managing file groups forming a large scale document. However, the invention of the prior art 1 handles each file as data having no structure. Therefore, in the case where the invention is applied to the document management, it is not possible to perform an operation with the consciousness of the structure of a document.

On the other hand, an invention disclosed by, for example, JP-A-8-44718 (hereinafter referred to as prior art 2) is known as a prior art with which a structured document can directly be managed. A document processing apparatus disclosed by the prior art 2 includes means for analyzing the structure of a registered document to generate tree structure data with logical elements such as chapters and sections taken as nodes and storing/managing the tree structure data. The apparatus further includes means with which a sub-tree forming a part of the document structure is shared between a plurality of documents, and means with which in the case where the addition, deletion and/or updating of-a logical element are made for a sub-tree, the resulting version is managed.

SUMMARY OF THE INVENTION

The technique shown by the prior art 1 makes it possible to manage the state of each file forming a document and the state of the document as a set of files. However, since there is no means for recognizing a logical structure possessed by the document and performing an operation along the recognized logical structure, the technique of the prior art 1 is not suitable for a document managing system which handles a structured document. On the other hand, in the technique shown by the prior art 2, since tree structure data representing a logical structure possessed by a registered document is directly stored and managed, the reference to structure information, the edition of structure information, the shared control in units of a sub-structure (or sub-tree), the management of versions of the sub-structure, and so forth become possible for the stored data of the structured document. However, in the case where a structured document described by a document markup language such as SGML, XML or the like is to be managed, the technique shown by the prior art 2 has the following problems to be solved.

Namely, though the apparatus disclosed by the prior art 2 is provided with the means for storing and managing the logical structure of a document, there are not provided means for managing the entity structure and the logical structure in association with each other and means for performing occasional mutual conversion between relationship data which is represented in a tree structure form and entity data which is described in a text form by use of a document markup language. In the case where an SGML document is to be registered in a document managing system to which the technique disclosed by the prior art 2 is applied, information concerning an entity structure possessed by the SGML document before registration will be lost.

Therefore, in the case where an SGML document formed by a plurality of entities is, to be registered in the document managing system applied with the technique disclosed by the prior art 2 to generate logical structure data, it is not possible to establish node sets corresponding to an entity structure possessed by the document made an object of registration so that each node set is applied with an attribute (such as owner's name, access right or the like) possessed by the corresponding entity and taken over therefrom. In the case where the collaboration in writing or the sharing of a sub-structure is to be made with respect to a registered document, the establishment of a node set providing the unit of allotment or sharing and the setting of an attribute for the node set are required. However, the document managing system applied with the technique of the prior art 2 has a need to meet this requirement through a manual work by a user, which makes the work remarkably complicated.

Also, in the case where a registered document is to be taken out as an SGML document in a text form again from the document managing system applied with the technique of the prior art 2, it is not possible to take out document data in a form divided into a plurality of files corresponding to an entity structure existed at the time of registration. It is only possible to take out the document data as a single document entity which includes the whole of document content. Accordingly, in the case where there is constructed a system in which the document managing system applied with the technique of the prior art 2 is used as a document server and the display/reuse of the document content is performed by a client computer connected to the document server through a network, a partial text required on the client side is incapable of the extraction and processing thereof in units of an entity. This will result in taking out the whole document data every time. Therefore, the amount of data transferred between the client and the server is increased, thereby deteriorating the efficiency of processing.

Also, in the case where there is employed a system construction in which the edition/updating of document content is performed on the client side, it is not possible to partially update the logical structure of a registered SGML document by taking out only a specified entity portion from the document to make the edition/updating thereof and registering the updated entity again. Therefore, the co-operative management and allotted writing of a large scale document by a plurality of persons in charge are difficult.

Further, in the case where a document is to be managed in such a manner that each entity forming the document is applied with digital signature data in order to ensure its content and generator (or creator), there is a problem that such strict document management is impossible in the document managing system applied with the technique of the prior art 2 since text data in units of an entity is lost through the development thereof into logical structure data at the stage of registration of the document.

An object of the present invention made for solving the above problems is to provide a technique with which a logical structure and an entity structure possessed by a registered document can be managed in association with each other in a mutually convertible form.

In a structured document managing method and system of the present invention for managing a structured document described using a document markup language, a structured document including a plurality of entities is managed by use of relationship data which indicates an entity structure and a logical structure of the structured document.

In the present invention, when a structured document described by a document markup language is to be registered, the document made the object of registration is subjected to syntax analysis to generate syntax analysis result data having an entity structure table which indicates an entity structure of the document and parsed instance data which indicates a logical structure of the document. Referring to the generated syntax analysis result data, the resource name of a resource for each entity forming the registration object document is set into the entity structure table in association with an entity identifier of that entity. Namely, entity types, entity names, entity identifiers and resource names for all entities forming the registration object document are made into a table form or arranged into the entity structure table while events such as tags detected in the course of syntax analysis of document instances of the registration object document and represented by symbols or marks are arranged as the parsed instance data in accordance with the order of occurrence thereof and in the form of a table indicating the correspondence between event types and parameters.

Next, the reference to the generated syntax analysis result data is made to extract a relationship between an entity structure and a logical structure possessed by the registration object document so that the entity identifier and a logical structure portion obtained by the parsed instance data are associated with each other to generate relationship data indicating the entity structure and the logical structure of the registration object document.

The relationship data is represented by a tree structure in which elements, data content and entity transition of the registration object document are connected as nodes. In this relationship data, that portion of sub-trees having a certain entity transition node as a root which excludes all sub-trees having a lower entity transition node as a root, forms a portion included as a content in an entity corresponding to the certain entity transition node. Namely, the relationship data in the present invention has therein a relationship between the entity structure and the logical structure in the form of an entity transition node.

In the present invention, the registration of a document made an object of registration is made in a form in which the entity structures of a plurality of entities originally possessed by the registration object document and logical structures thereof are held, as mentioned above. Therefore, in the case where a registered document is to be updated, it is possible to perform a processing for partial updating with a specified entity or a specified logical structure portion of the registered document being selected.

In the case where an entity of a registered document is to be updated, any entity forming the registered document is selected as an object of updating so that the data content of the selected update object entity is subjected to updating. And, there is generated partial relationship data which indicates an entity structure and a logical structure of the update object entity. Next, relationship data of the registered document is updated by determining that portion or sub-region of the relationship data of the registered document which corresponds to the update object entity and replacing the relationship data of the determined sub-region by the generated partial relationship data of the update object entity.

In the case where a logical structure of a registered document is to be updated, any logical structure of the registered document is selected as an object of updating so that the data content of the selected update object logical structure is subjected to edition or updating. And, there is generated edition result entity data in which partial relationship data of an entity in a region of the logical structure subjected to edition is described in a character string form. The data content of the entity in the region of the logical structure subjected to edition is replaced by the generated edition result entity data. Next, a sub-region of the relationship data of the registered document corresponding to the above-mentioned entity is determined and the relationship data of the determined sub-region is replaced by the partial relationship data of that entity, thereby updating the relationship data of the registered document.

In the present invention as mentioned in the above, the entity structure and the logical structure are managed in association with each other and mutual conversion is occasionally made between relationship data represented by a tree structure and entity data described in a text form by use of a document markup language. In the case where an SGML document is registered into a document managing system to which the prior art mentioned above is applied, a plurality of entities including files are handled as a single document entity in which the whole of the content of the document is included. Therefore, information concerning an entity structure possessed by the SGML document before registration thereof is lost. In the present invention, however, information concerning an entity structure of a document made an object of registration is held.

In the present invention, therefore, in the case where an SGML document formed by a plurality of entities is to be registered so that relationship data is generated, it is possible to establish node sets corresponding to an entity structure possessed by the document made an object of registration so that each node set is applied with an attribute such as owner's name or access right possessed by the corresponding entity and taken over therefrom. In the case where an allotted (or partial-charge) writing or the sharing of a sub-structure is to be made with respect to a registered document, the establishment of a node set providing the unit of allotment or sharing and the setting of an attribute for the node set are required. In the present invention, it is not necessary for a user to make the attribute setting through a manual work since the attribute possessed by the corresponding entity is taken over.

Also, in the case where a registered document is to be taken out as an SGML document in a text form again, the above-mentioned prior art is not capable of taking out document data in a form divided into a plurality of files corresponding to an entity structure existed at the time of registration. In the present invention, on the other hand, the entity structure existed at the time of registration is held as it is. Therefore, it is possible to take out the document data in a form divided into a plurality of files corresponding to the entity.

Accordingly, in the case where there is constructed a system in which a document managing system according to the present invention is used as a document server and the display/reuse of the document content is performed by a client computer connected to the document server through a network, a partial text required on the client side can be taken out and processed in units of an entity. Namely, there will not result in that the whole document data is taken out every time. Therefore, the amount of data transferred between the client and the server is reduced, thereby improving the efficiency of processing.

Also, in the case where there is employed a system construction in which the edition/updating of document content is performed on the client side, it is possible to partially update the logical structure of a registered SGML document by taking out only a specified entity portion from the document to make the edition/updating thereof and registering the updated entity again. Therefore, the co-operative management and allotted writing of a large scale document by a plurality of persons in charge are easily possible.

Further, since text data in units of an entity is not lost, it is possible to make strict document management with digital signature data applied to each entity forming the document in order that its content and generator (or creator) are ensured.

According to the structured document managing method and system of the present invention as mentioned above, relationship data indicating each of a plurality of entities forming a document made an object of registration and a logical structure portion corresponding to that entity is generated to manage the plurality of entities. Therefore, a logical structure and an entity structure possessed by a registered document can be managed in association with each other in a mutually convertible form.

BRIEF DESCRIPTION OF THE DRAWINGS

FIG. 7 is a diagram showing a specific example of parsed instance data in the embodiment;

DESCRIPTION OF THE EMBODIMENTS

In the following, the description will be made of an embodiment of a structured document managing system for managing the entity structure and the logical structure of a structured document in association with each other.

Figure 1:
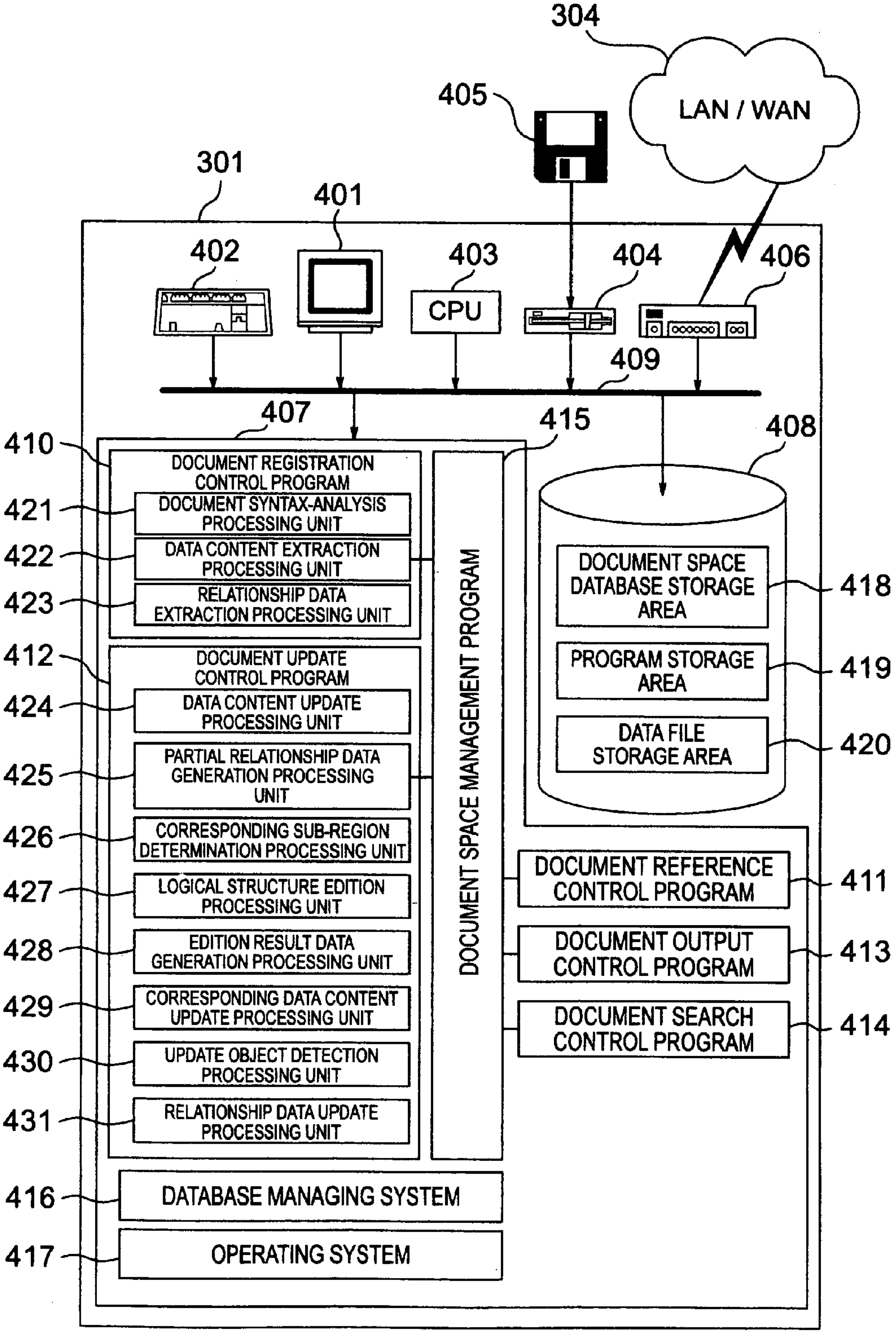
FIG. 1 is a diagram showing the schematic construction of a document managing server according to an embodiment of the present invention.

FIG. 1 is a diagram showing the schematic construction of a document managing server according to the present embodiment. As shown in FIG. 1, the document managing server in the present embodiment has a document syntax analysis processing unit 421, a data content extraction processing unit 422, a relationship data extraction processing unit 423, a data content update processing unit 424, a partial relationship data generation processing unit 425, a corresponding sub-region determination processing unit 426, a logical structure edition processing unit 427, an edition result data generation processing unit 428, a corresponding data content update processing unit 429, an update object detection processing unit 430, and a relationship data update processing unit 431.

The document syntax analysis processing unit 421 is a processing unit for making the syntax analysis of a document made an object of registration, thereby generating syntax analysis result data having an entity structure table which indicates an entity structure of the registration object document and parsed instance data which indicates a logical structure of the registration object document.

The data content extraction processing unit 422 is a processing unit for referring to the generated syntax analysis result data to read the data content of each entity forming the registration object document so that the read data content is stored into a document space database storage area 418 and for setting the resource name of a resource of the stored entity data content into the entity structure table in association with an entity identifier of the corresponding entity.

The relationship data extraction processing unit 423 is a processing unit for generating relationship data which indicates the entity structure and the logical structure of the registration object document. In the relationship data, each entity forming the registration object document and a logical structure portion obtained by the parsed instance data and corresponding to that entity are associated with each other.

The data content update processing unit 424 is a processing unit with which any entity forming a registered document is selected as an object of updating from relationship data indicating an entity structure and a logical structure of the registered document so that the data content of the selected entity is updated.

The partial relationship data generation processing unit 425 is a processing unit for generating partial relationship data which indicates an entity structure and a logical structure of the update object entity. The corresponding sub-region determination processing unit 426 is a processing unit for determining that portion or sub-region of the relationship data of the registered document which corresponds to the update object entity.

The logical structure edition processing unit 427 is a processing unit for selecting any logical structure of the registered document as an object of updating from the relationship data indicating the entity structure and the logical structure of the registered document so that the selected logical structure is subjected to edition. The edition result data generation processing unit 428 is a processing unit for generating edition result entity data in which partial relationship data indicating an entity existing in the region of the edited logical structure is described in a character string form.

The corresponding data content update processing unit 429 is a processing unit for replacing the data content of the above-mentioned entity by the generated edition result entity data. The update object detection processing unit 430 is a processing unit for determining that portion or sub-region of the relationship data of the registered document which corresponds to the above-mentioned entity.

The relationship data update processing unit 431 is a processing unit for replacing the relationship date of the above-mentioned sub-region by the partial relationship data of the above-mentioned entity to update the relationship data of the registered document.

It is assumed that a program for causing the document managing server to function as the document syntax analysis processing unit 421, the data content extraction processing unit 422, the relationship data extraction processing unit 423, the data content update processing unit 424, the partial relationship data generation processing unit 425, the corresponding sub-region determination processing unit 426, the logical structure edition processing unit 427, the edition result data generation processing unit 428, the corresponding data content update processing unit 429, the update object detection processing unit 430 and the relationship data update processing unit 431 is recorded in a recording medium such as a CD-ROM and stored in a magnetic disk or the like and is thereafter loaded into a memory for execution. The medium for recording the program may be a medium other than the CD-ROM.

A document registration control program 410 performs a processing for controlling the whole of a document registration processing, a processing for establishing node sets corresponding to an entity structure possessed by a document made an object of registration so that each node set is applied with an attribute possessed by the corresponding entity and taken over therefrom, and a processing with which a digital signature applied to each entity forming the registration object document is registered together with data content of that entity.

A document update control program 412 performs a processing with which in accordance with an attribute (such as owner's name or access right) of a node set established corresponding to an entity structure possessed by a registered document, the control of access to an object of updating is made for each node set to take out an object of edition in units of an entity forming the registered document so that the object is subjected to updating, and a processing for controlling a processing for taking out the plurality of objects of edition separately to perform the edition of a structured document for the plurality of objects of edition in parallel with each other and applying a digital signature to an entity which forms the object of edition after updating.

Figure 2:
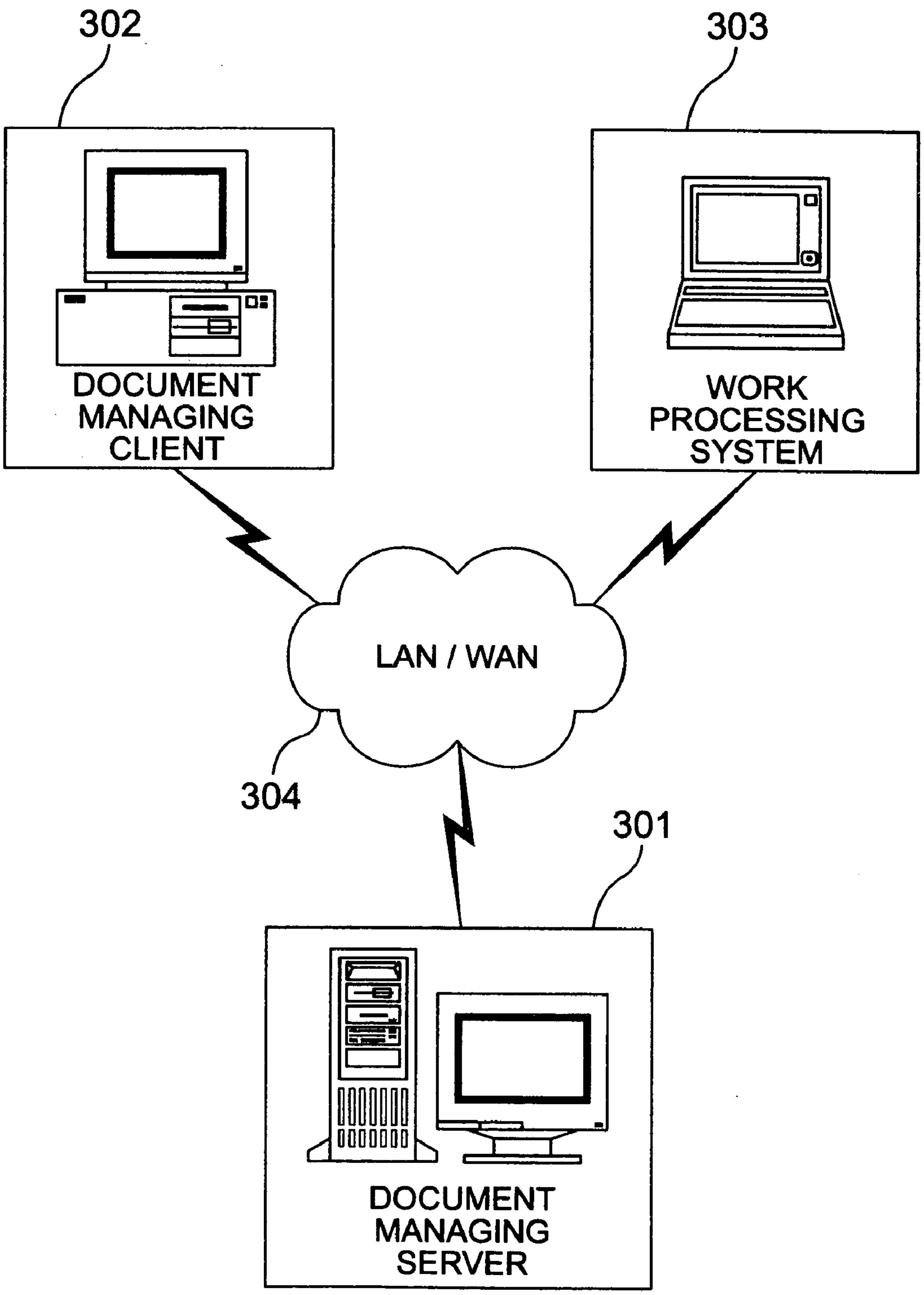
FIG. 2 is a diagram showing the overall construction of a document managing system in the embodiment.

FIG. 2 is a diagram showing the overall construction of a document managing system in the present embodiment. As shown in FIG. 2, the document managing system in the present embodiment is composed of a document managing server 310, a document managing client 302, a document work processing system 303 and a network 304.

The document managing server 301 performs a principal processing related to document management which includes the registration/storage of a document made an object of management, the reference to and the updating of the structure and data content of a registered document, the search for a document having a specified attribute or character string, the deletion of a registered document, and so forth.

The document managing client 302 provides a GUI (Graphical User Interface) for operating a group of documents managed by the document managing server 301. The document managing client 302 transfers a command or data for a processing such as the registration of a document, the reference to a document, or the updating or search of a document to the document managing server 301 through the network 304 in accordance with an instruction from a user to cause the document managing server 301 to execute the command.

Similarly to the document managing client 302, the work processing system 303 transfers a command or data to the document managing server 301 in an instruction from a user to cause the document managing server 301 to execute the command. However, the work processing system 303 provides not a general GUI for document management but a dedicated GUI for performing a specified work. The network 304 is a LAN (Local Area Network) or WAN (Wide Area Network). The network 304 provides means for connecting a plurality of computers so that they transfer commands and data to each other.

In the example shown in FIG. 2, two computers including the document managing client 302 and the work processing system 303 are used as clients for the document managing server 301. However, the client construction may be provided with only one computer or with three or more computers. Also, the client may be only the document managing client or only the work processing system.

In the example shown in FIG. 2, the network 304 is used as means for transferring commands or data from the document managing client 302 and the work processing system 303. Alternatively, there may be employed a construction in which a portable medium such as a floppy disk, magneto-optical disk, WORM (Write Once Read Multiple) optical disk or the like is used or a construction in which the portable medium and the network 304 are used in combination. Also, there may be employed a construction in which the client is implemented on the same computer as the document managing server 301 so that no data transfer is made.

Now, the description will be made of the document managing server 301 which is a main constituent element in the present embodiment. The document managing server 301 shown in FIG. 1 includes a display unit 401, a keyboard 402, a CPU (Central processing Unit) 403, a floppy disk drive 404, a floppy disk 405, a communication controller 406, a main memory 407, a magnetic disk device 408 and a system bus 409.

The display unit 401 is used for displaying, for example, the situation of execution of a processing in the document managing server 301. The keyboard 402 is used for inputting, for example, a command which gives an instruction for the start/stop of the server 301. The CPU 403 executes various programs which form the server 301. The floppy disk drive 404 is used for performing the reading/writing of data for the floppy disk 405.

The floppy disk 405 is used for performing the transfer of data (such as a document made an object of registration) between the floppy disk 405 and another system. The communication controller 406 is used for communicating with the document managing client 302 and the work processing system 303 through the network 304 to perform the exchange of commands and data.

The main memory 407 holds various programs for performing processings in the server 301 and temporal data. The magnetic disk device 408 is used as means for storing registered document data and various data used by the server 301 for document management. The system bus 409 interconnects the various components or units mentioned above.

The main memory 407 has a document registration control program 410, a document reference control program 411, a document update control program 412, a document output control program 413, a document search control program 414, a document space management program 415, a database managing system 416 and an operating system 417 which are held therein. The magnetic disk device 408 has a document space database storage area 418, a program storage area 419 and a data file storage area 420 which are ensured therein.

The document registration control program 410 reads a document made an object of registration and described by use of a document markup language. The document is read from the floppy disk 405, the data file storage area 420 or the network 304. The program 410 makes the syntax analysis of the read registration object document so that entity data and logical structure data possessed by the document and a relationship therebetween are stored into the document space database storage area 418.

The document reference control program 411 reads entity data or logical structure data of a registered document stored in the document space database storage area 418 or both the entity data and the logical structure data or information to extract a part of the read data which is in turn transferred to a requesting client.

The document update control program 412 performs a processing for updating the content of entity data or logical structure data of a registered document stored in the document space database storage area 418 or both the entity data and the logical structure data.

The document output control program 413 reads entity data of a registered document from the document space database storage area 418 so that an entity forming the registered document is outputted to the floppy disk 405 or the data file storage area 420 or transferred to a requesting client (the document managing client 302 or the work processing system 303) through the network 304.

The document search control program 414 makes the search of a group of registered documents stored in the document space database storage area 418 in accordance with the conditional expression of search received from a requesting client and transfers search result data to the requesting client.

The document space management program 415 receives a command from a requesting client through the network 304 to start the document registration control program 410, the document reference control program 411, the document update control program 412, the document output control program 413 or the document search control program 414 in accordance with the type of the command so that the started program performs a processing which corresponds to the content of the command. Also, the document space management program 415 performs some processings which include a processing for generating a folder object for classification/adjustment of a group of registered documents to store the generated folder object into the document space database storage area 418, and a processing for deleting a part of a registered document or document group from the document space database storage area 418.

The database managing system 416 controls all processings related to the storage, updating, deletion and search of data for the document space database storage area 418. All programs making access to the document space database storage area 418 perform their processings through the database managing system 416. The operating system 417 provides fundamental functions for executing programs forming the server 301 on the computer. The functions include the start/initialization of the system, the data transfer for various peripheral units, and so forth.

The document space database storage area 418 is a database for storing data concerning all documents registered in the server 301 and all relevant data required by the server 301 for document management. The program storage area 419 stores therein all programs which form the server 301. These programs are read by the operating system 417 at the time of system start and are transferred to the main memory 407. The data file storage area 420 stores data files which are used by the operating system 417 or various utility programs executed on the server 301.

In the present embodiment, there is employed a construction in which the floppy disk 405 is used as a portable medium for data exchange or transfer. However, various portable media such as a magneto-optical disk, WORM optical disk and so forth may be used. In the present embodiment, there is employed a construction in which document data and document management data are stored in the database. However, those data may be stored as files in the data file storage area 420 without a need to use the database managing system.

Next, the fundamental operation procedure of the document managing server 301 in the present embodiment will be described by use of PAD's (problem Analysis Diagrams).

Figure 3:
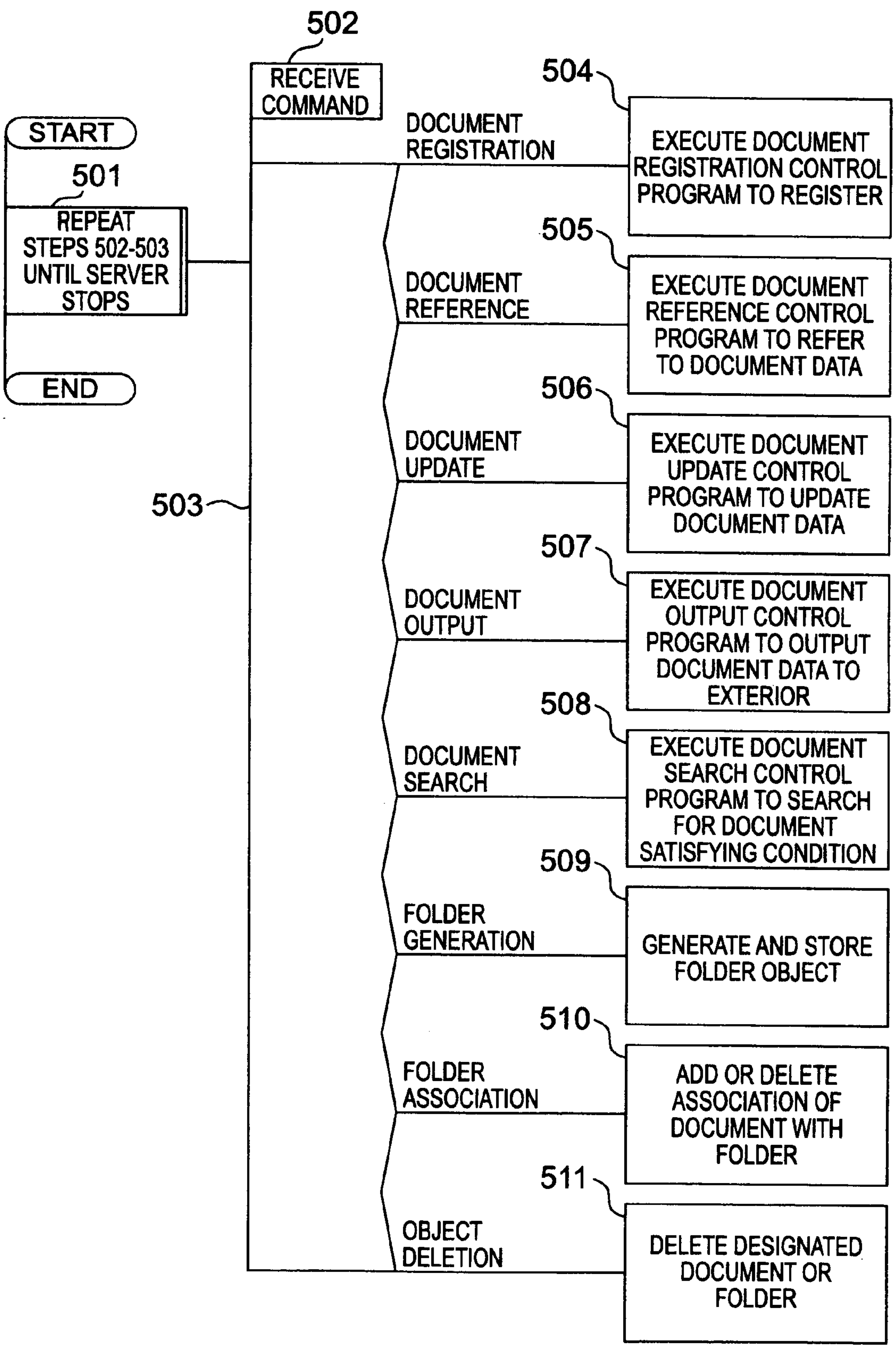
FIG. 3 is a PAD showing an epitomized procedure of a document space management program for controlling the operation of the whole of the document managing server 301 in the embodiment.

FIG. 3 is a PAD showing an epitomized procedure of the document space management program 415 for controlling the operation of the whole of the document managing server 301 in the present embodiment. When the document space management program 415 is started by a server start command or the like inputted from the keyboard 402, the program 415 enters a loop in which a predetermined processing is performed as a server each time a command from a client is received (step 501). This loop is continued until a command instructing to stop the server is inputted from the keyboard 402.

The loop of step 501 repeats a processing for receiving a command from the client (step 502) and a processing for judging the type of the received command to make a branch for a processing which corresponds to the command type (step 503).

In step 503, the type of the received command is judged to select and carry out one of steps 504 to 511 in accordance with the command type. In the case where the received command is a command making a request for registration of a new document, the document registration control program 410 is executed to store the designated document into the document space database storage area 418 (step 504).

In the case where the received command is a command making a request for reference to data content possessed by a specified document having already been registered, the document reference control program 411 is executed to read required data from the document space database storage area 418 and to transfer the read data to the requesting client (step 505).

In the case where the received command is a command making a request for updating of data content possessed by a specified document having already been registered, the document update-control program 412 is executed to update the data content of the registered document stored in the document space database storage area 418 (step 506).

In the case where the received command is a command making a request for output of a part or the whole of a specified document having already been registered, the document output control program 413 is executed to read data the content of the registered document from the document space database storage area 418 so that the read data is outputted to the floppy disk 405 or the data file storage area 420 or transferred to the requesting client through the network 304 in accordance with an instruction included in the command (step 507).

In the case where the received command is a command making a request for a set of documents satisfying a specified conditional expression of search, the document search control program 414 is executed to search a group of registered documents stored in the document space database storage area 418 so that search result data is transferred to the requesting client (step 508).

In the case where the received command is a command making a request for generation of a folder object for classification/adjustment of a group of documents, the folder object is newly generated and stored into the document space database storage area 418 (step 509).

In the case where the received command is a command making a request for association of a specified document with a specified folder object or a request for deletion of a specified association, the requested addition or deletion of association is made (step 510).

In the case where the received command is a command making a request for deletion of a specified document having already been registered or a specified folder object, the designated document or folder object is deleted from the document space database storage area 418 (step 511).

Figure 4:
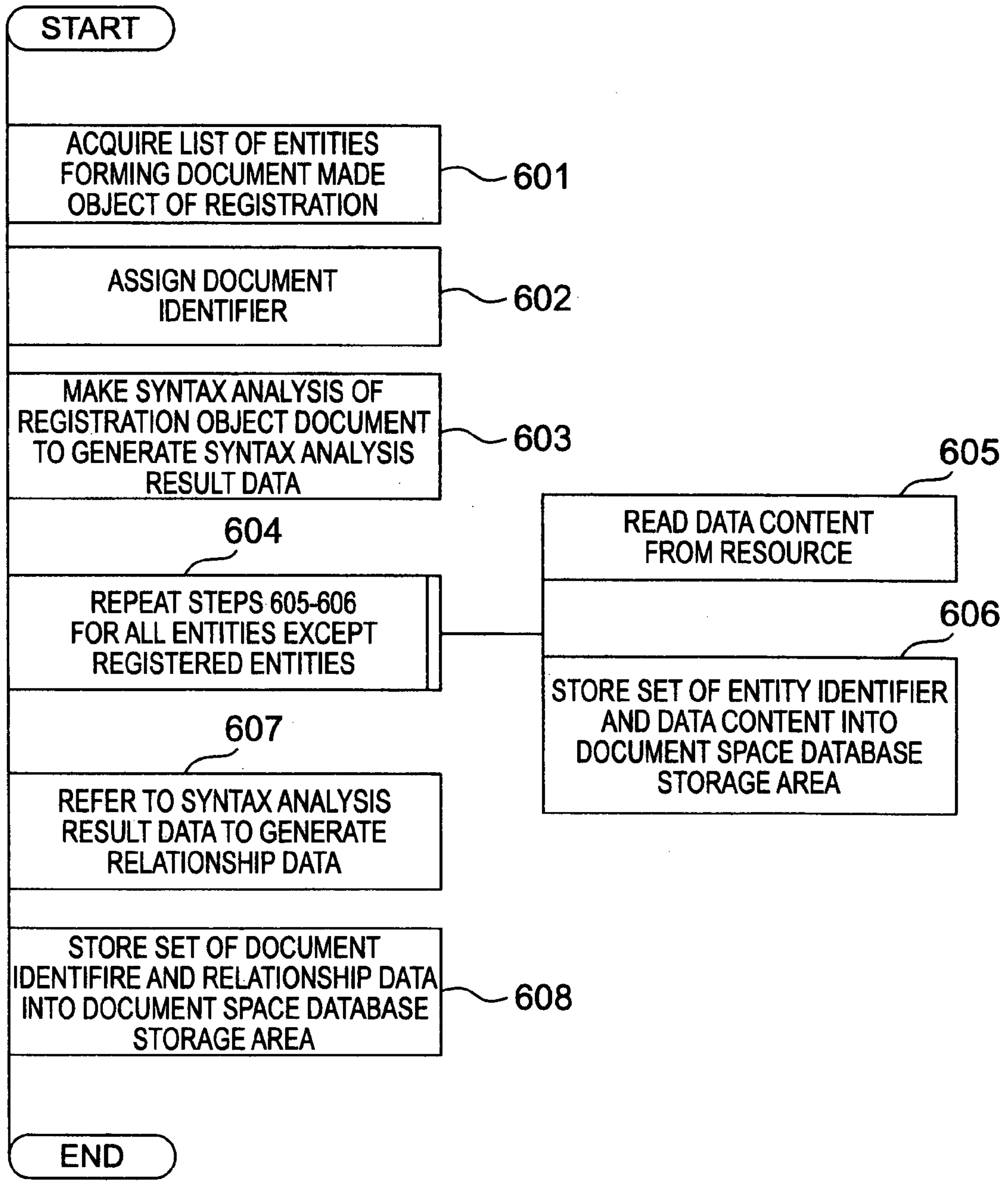
FIG. 4 is a PAD showing an epitomized procedure of a document registration control program in the embodiment.

FIG. 4 is a PAD showing an epitomized procedure of the document registration control program 410 in the present embodiment. This program 410 is called by the document space management program 415 in accordance with a command from a client making a request for registration of a document. A procedure for the operation of the document registration control program 410 in the present embodiment will now be described.

When the document registration control program 410 is called by the document space management program 415, the program 410 first calls a list of entities forming a document made an object of registration to acquire the list of entities as parameters (step 601). This entity list includes the resource name of a resource in which the data content of each entity forming the registration object document is held. In the case where the registration object document is formed by a plurality of entities, the entity list further includes information for identifying which one of those entities is a document entity.

The resource, which is the origin of acquired data content, may include a data file stored in the floppy disk 405 or the data file storage area 420, a network resource capable of being accessed through the network 304, and a registered entity stored in the document space database storage area 418. In the case where the resources are a data file, a resource on the network and a registered entity, its path name, its network address and an entity identifier for uniquely identifying that entity in distinction from other registered entities are designated as the resource names, respectively.

Next, the document made the object of registration is assigned with a document identifier for uniquely identifying that document in distinction from all registered documents (step 602). The document syntax analysis processing unit 421 makes the syntax analysis of the registration object document starting from its document entity to generate syntax analysis result data (step 603). In this syntax analysis process, those ones of entities forming the registration object document which exclude entities having already been registered, are all assigned with entity identifiers for uniquely identifying them in distinction from all of the registered entities.

Next or in step 604, the data content extraction processing unit 422 refers to the generated syntax analysis result data to repeat steps 605 and 606 for all those ones of the entities forming the registration object document which exclude the registered entities. In step 605, the data content of an entity made an object of processing is read from the corresponding resource. In step 606, a set of an entity identifier of that entity and the read data content thereof is stored into the document space database storage area 418 to perform entity registration.

Next or in step 607, the relationship data extraction processing unit 423 refers to the generated syntax analysis result data to extract a relationship between an entity structure and a logical structure possessed by the registration object document, thereby generating relationship data which indicates each entity forming the registration object document and a logical structure portion corresponding to that entity. In step 608, a set of the document identifier assigned to the registration object document and the generated relationship data is stored into the document space database storage area 418 to perform document registration, thereby completing the process.

Figures 5, 6:
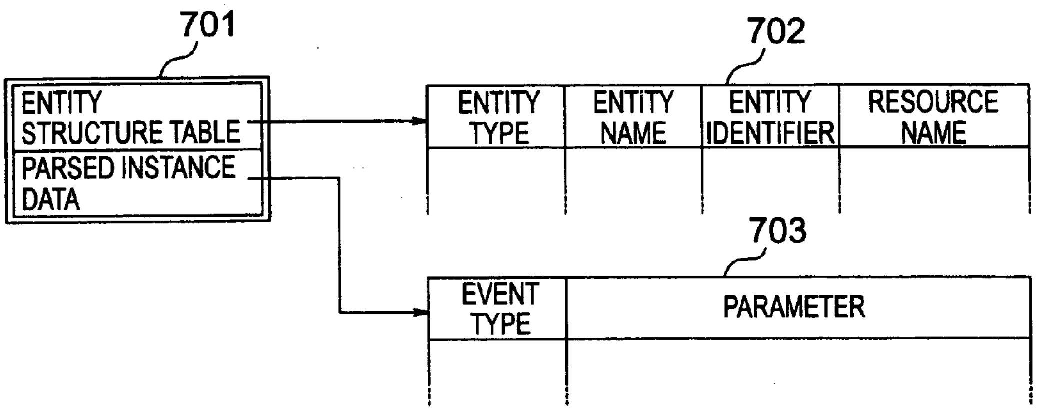
FIG. 5 is a diagram showing the data structure of syntax analysis result data in the embodiment.
FIG. 6 is a diagram showing a specific example of an entity structure table in the embodiment.

FIG. 5 is a diagram showing the data structure of the syntax analysis result data in the present embodiment. Referring to FIG. 5, the syntax analysis result data 701 generated by the document registration control program 410 in step 603 includes two principle parts, that is, an entity structure table 702 and parsed instance data 703.

The entity structure table 702 includes data in which the entity type, entity name, entity identifier and resource name of each entity forming a document made an object of registration are arranged in a table form. The item "ENTITY TYPE" uses a symbol to indicate whether the corresponding entity is a document entity (DOC), a text entity (TEXT) or a non-SGML data entity (NDATA). The item "ENTITY NAME" uses a character string to indicate an entity name which is used in the registration object document for referring to the corresponding entity. However, in the case where the entity is a document entity, this item is blank. The item "ENTITY IDENTIFIER" indicates an entity identifier assigned to the corresponding entity. The item "RESOURCE NAME" uses a character string to indicate the resource name of a resource holding the data content of the corresponding entity. However, in the case where the entity is a registered entity, this item is blank.

The parsed instance data 703 is data in which events detected in the course of syntax analysis of document instances of the registration object document are arranged in accordance with the order of occurrence thereof and in a table form indicating the correspondence between event types and parameters. The item "EVENT TYPE" uses a symbol to indicate whether the corresponding event is a start tag (STAG) of an element, an end tag (ETAG) thereof, a tag (ITAG) serving as both the start and the end of an element having no content, parsed character string data (PCDATA), entity reference (EREF) or entity end (EE). The item "PARAMETER" indicates additional data determined corresponding to the event type. In the case where the event type is a start tag, the element type name of an element having that start tag at a head position and an attribute value (option) designated in the start tag are indicated as a parameter. In the case where the event type is an end tag, the element type name of an element having that end tag at a tail position is indicated as a parameter. In the case where the event type is parsed character string data, the content of the character string is indicated as a parameter. In the case where the event type is entity reference, the entity name of an entity to be referred to is indicated as a parameter. The entity end event has no parameter.

FIG. 6 is a diagram showing a specific example of the entity structure table 702 in the present embodiment. The example shown in FIG. 6 corresponds to an entity structure table 702 generated as the result of syntax analysis of the SGML document shown in FIG. 15. Rows 801 to 804 in FIG. 6 respectively correspond to the document entity 101, the text entities 102 and 103 and the data entity 104 shown in FIG. 15.

FIG. 7 is a diagram showing a specific example of the parsed instance data 703 in the present embodiment. The example shown in FIG. 7 corresponds to parsed instance data 703 generated as the result of syntax analysis of the SGML document shown in FIG. 15. As shown in FIG. 7, the SGML document described in accordance with the syntax of the document markup language SGML is converted into a sequence of events which indicates the occurrence of tags, parsed character string data, entity reference and so forth (step 603 of FIG. 4 mentioned above).

The relationship data extraction processing unit 423 of the document registration control program 410 refers to the parsed instance data 703 of the syntax analysis result data to extract a logical structure possessed by the registration object document and associates entity reference (EREF) in the parsed instance data 703 with an entity identifier in the entity structure table 702, thereby generating relationship data in which the entity identifier of each entity forming the registration object document and a logical structure portion corresponding to that entity are represented by a tree structure.

Figure 8:
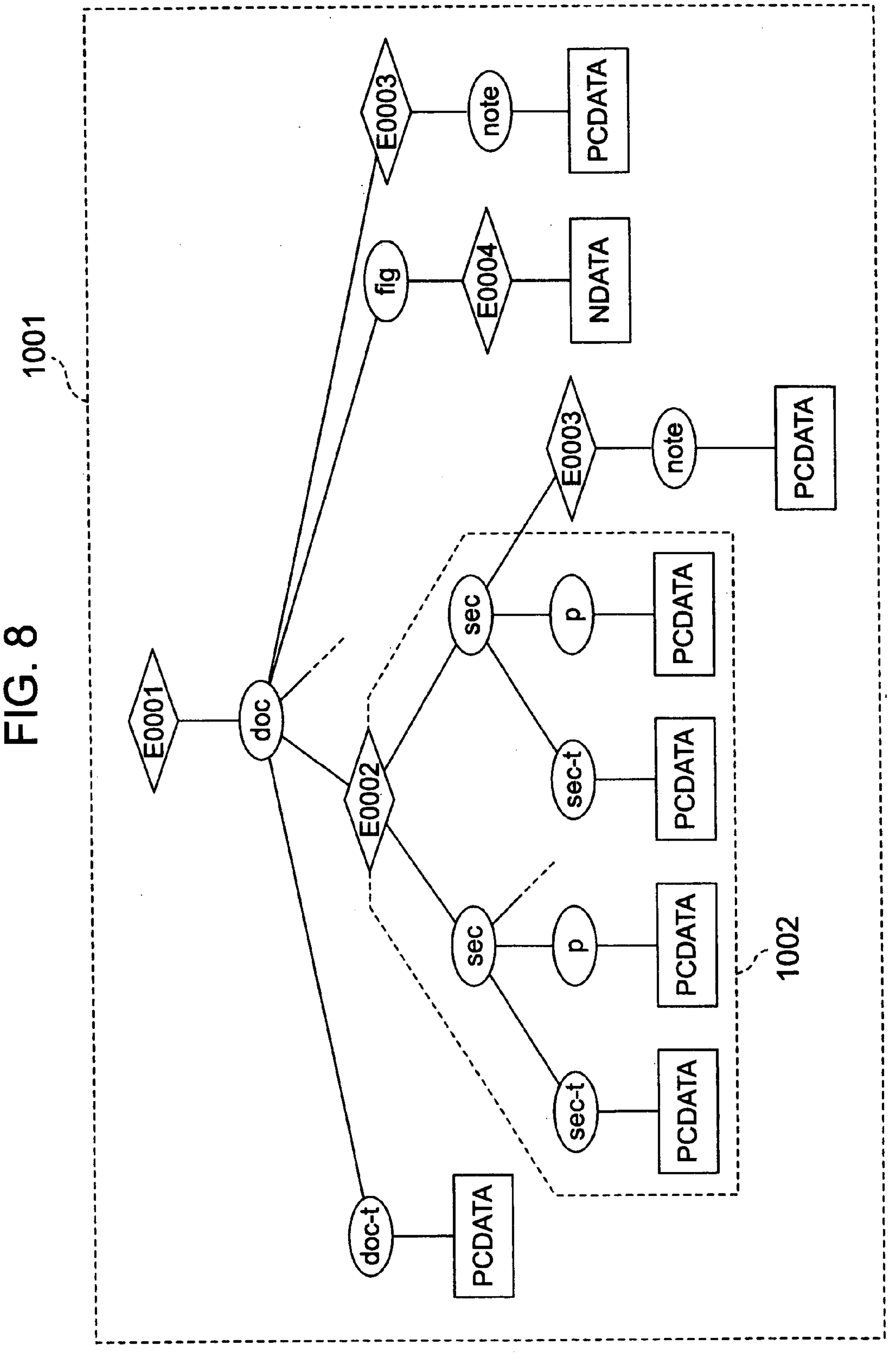
FIG. 8 is a diagram showing the data structure of relationship data in the embodiment.
Figure 15:
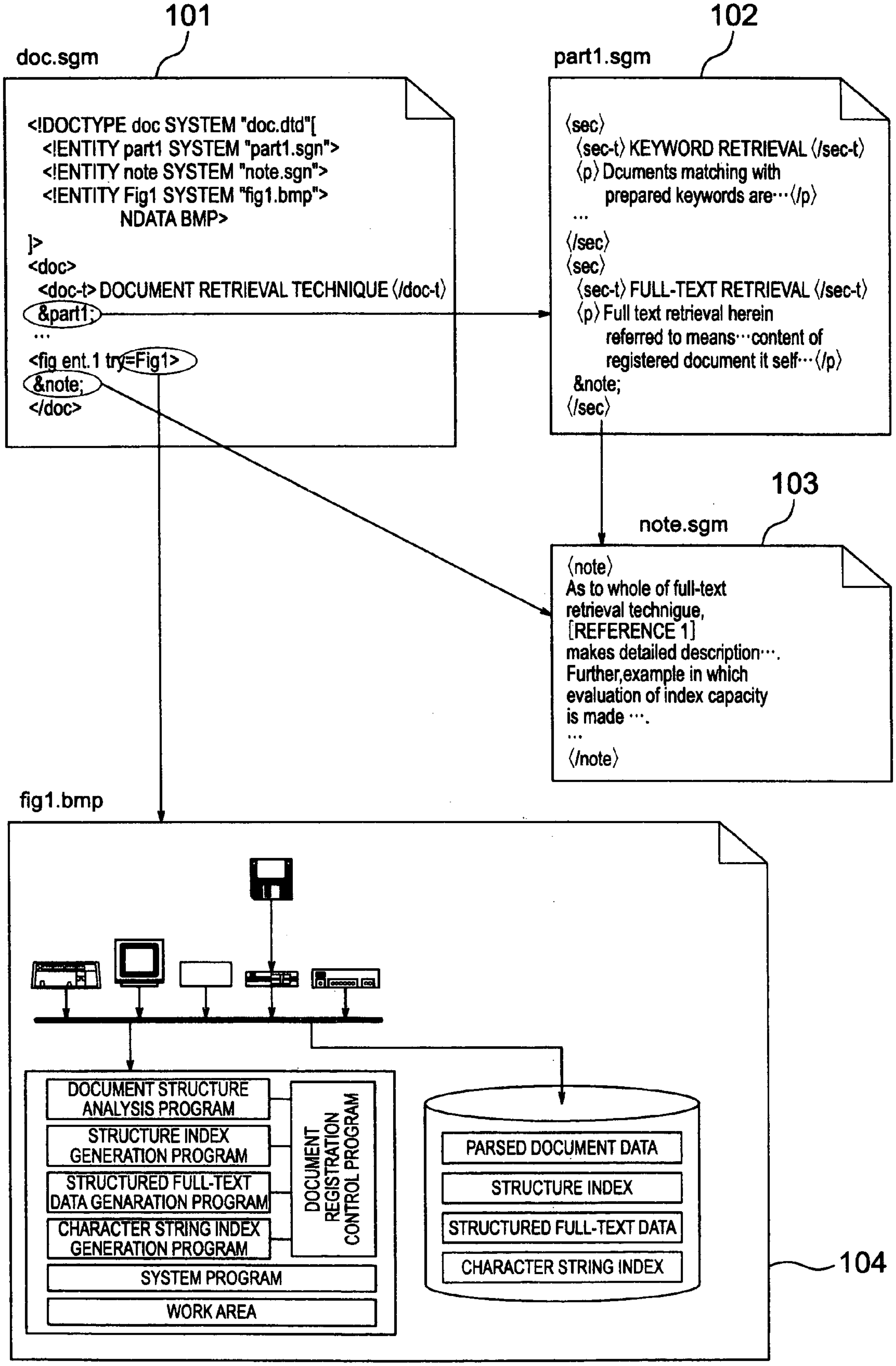
FIG. 15 is a diagram showing an example of the conventional structured document described by a document markup language SGML.
Figure 16:
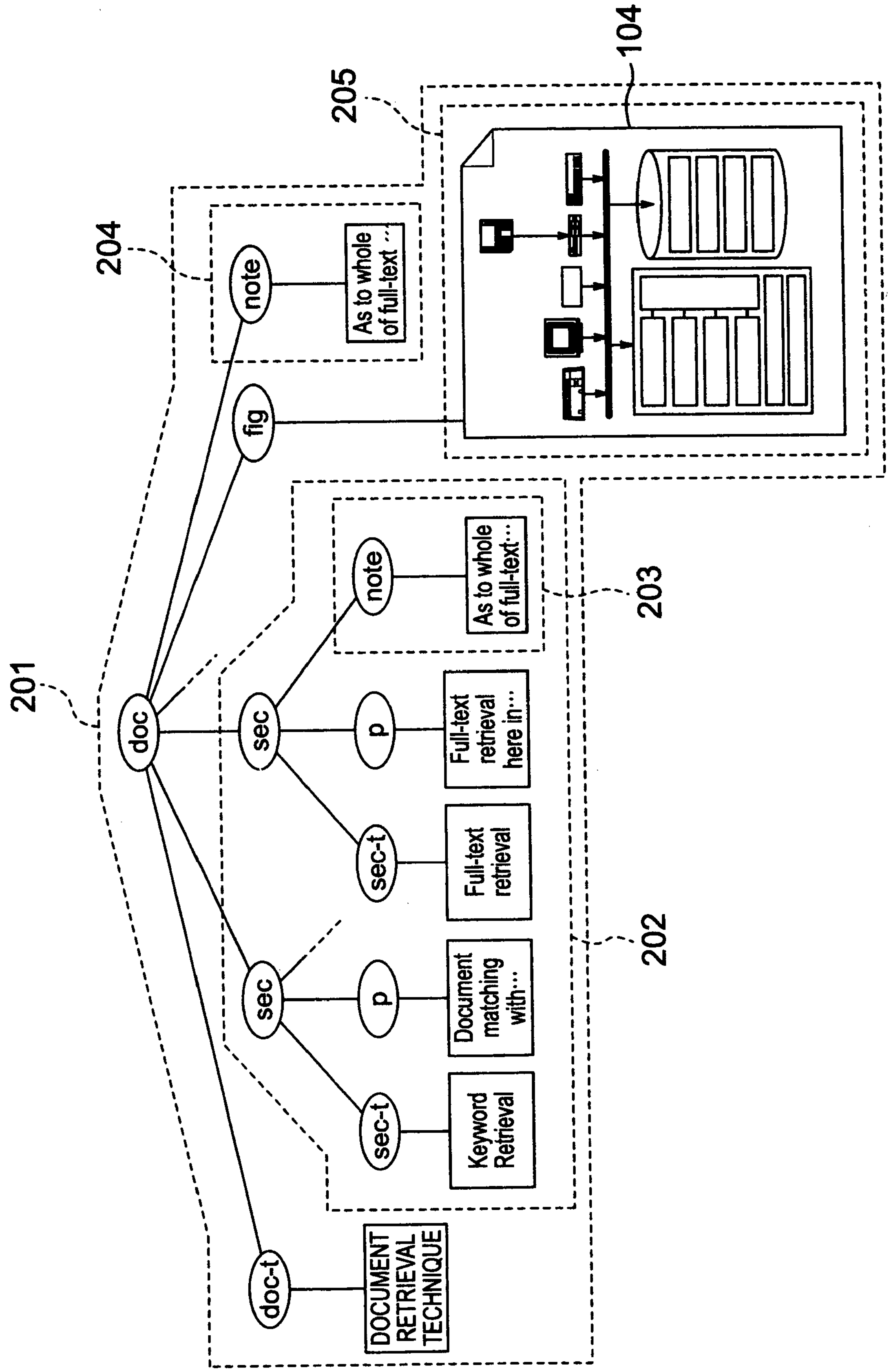
FIG. 16 is a diagram showing an example of a logical structure obtained by analyzing the conventional SGML document shown in FIG. 15.

FIG. 8 is a diagram showing the data structure of relationship data in the present embodiment. FIG. 8 shows, by way of example, the data structure of relationship data generated by the relationship data extraction processing unit 423 of the document registration control program 410 in the case where the SGML document shown in FIG. 15 is processed as a document made an object of registration.

As shown in FIG. 8, the relationship data 1001 is represented as a tree structure. In FIG. 8, an elliptic node represents an element and a character string in this node indicates the element type of that element. A rectangular node represents data content and a character string in this node indicates the type of the data content (parsed character string data PCDATA or non-SGML data NDATA). A rhombic node represents an entity transition and a character string in this node indicates an entity identifier.

That portion of sub-trees having a certain entity transition node as a root which excludes all sub-trees having lower entity transition nodes as roots, is included as a content in an entity corresponding to that certain entity transition node. Namely, the relationship data generated by the document registration control program 410 in the present embodiment includes a relationship between a logical structure and an entity structure (or entity construction) in the form of an entity transition node. In the example shown in FIG. 8, a sub-region 1002 enclosed by chained line corresponds to the content of the entity E0002 (or the text entity 802 shown in FIG. 6).

Figure 9:
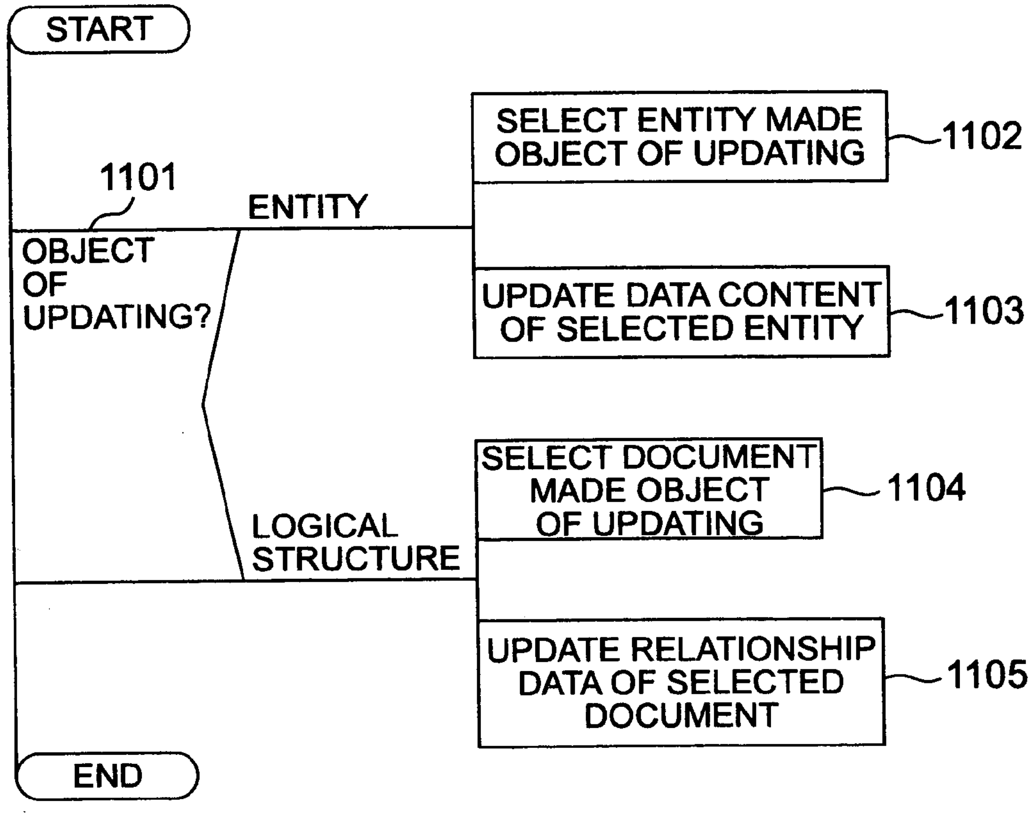
FIG. 9 is a PAD showing an epitomized procedure of a document update control program in the embodiment.

FIG. 9 is a PAD showing an epitomized procedure of the document update control program 412 in the present embodiment. This program 412 is called by the document space management program 415 in accordance with a command from a client making a request for updating of a document. A procedure for the operation of the document update control program 412 in the present embodiment will now be described.

When the document update control program 412 is called by the document space management program 415, the program 412 first judges whether the content of any entity forming a registered document or a logical structure of the registered document is designated as an object of updating (step 1101). In the case where the entity is designated as the object of updating, the flow branches to processings in steps 1102 and 1103. On the other hand, in the case where the logical structure is designated as the object of updating, the flow branches to processings in steps 1104 and 1105. At the time of return from the branch, the process is completed.

In step 1102, a parameter (or an entity identifier) given at the time of call is used to select the entity of a registered document which is made an object of updating. Next or in step 1103, a processing for updating the data content of the selected entity is performed.

In step 1104, a parameter (or a document identifier) given at the time of call is used to select a registered document which holds a logical structure made an object of updating. Next in step 1105, a processing for updating the logical structure possessed by the selected document is performed.

Figure 10:
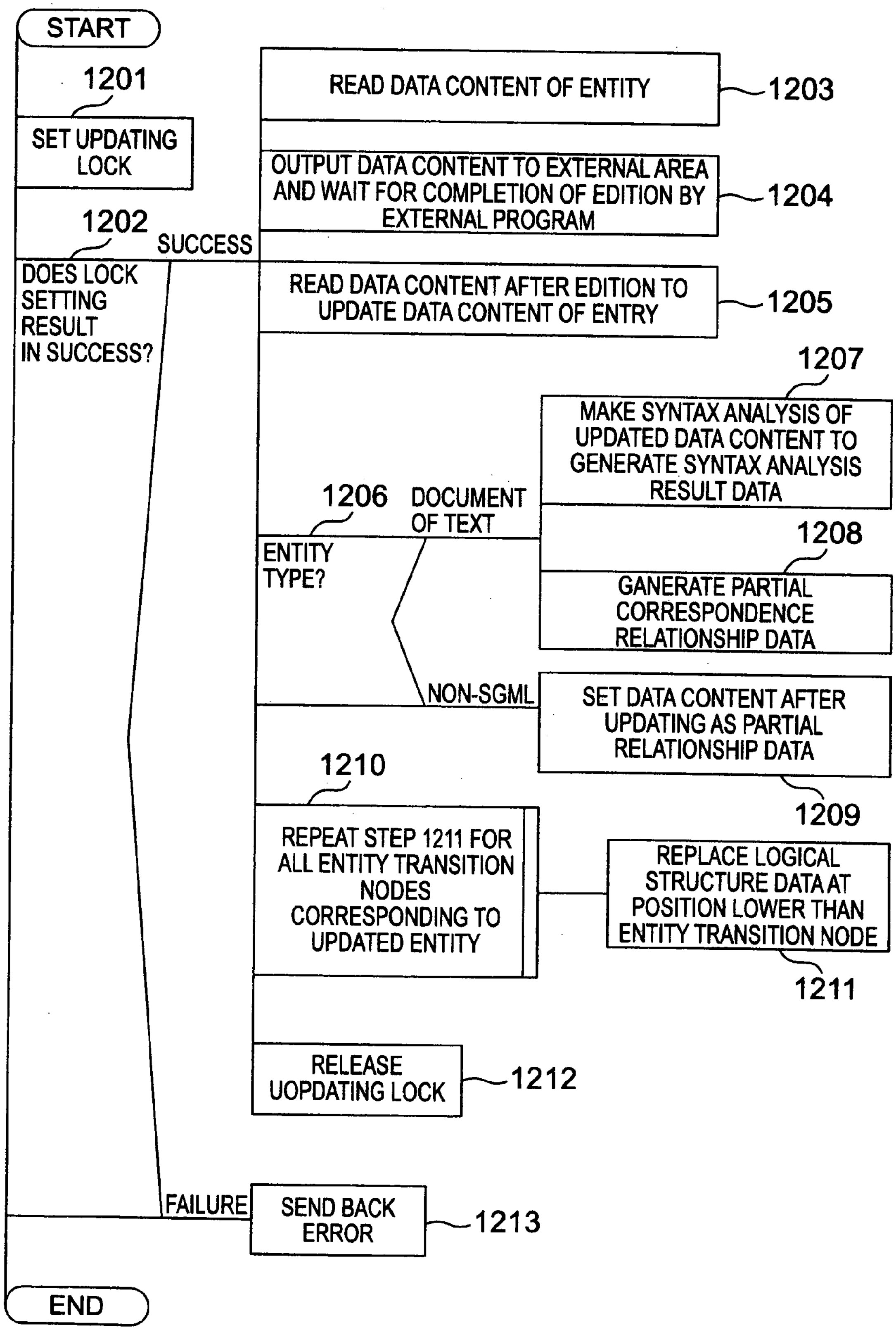
FIG. 10 is a PAD showing a procedure for updating of the content of a selected entity in the embodiment.

FIG. 10 is a PAD showing a procedure for updating the content of a selected entity in the present embodiment. The details of step 1103 in FIG. 9 or the processing for updating the content of the selected entity will now be described.

As shown in FIG. 10, the data content update processing unit 424 for performing the updating of the selected entity first sets a lock for the update object entity (step 1201). Such lock setting is made in order to prevent one entity from being updated by a plurality of users. Next, the check is made of whether or not the lock setting results in a success (step 1202). In the case of a success, an update processing in steps 1203 to 1211 is performed. In the case of a failure, an error code indicating that the lock has already been set and the updating is therefore impossible is sent back (step 1213), thereby completing the process.

In step 1203, the data content of the update object entity is read from the document space database storage area 418. Next or in step 1204, the read data content is outputted to an external area (such as the floppy disk 405, the data file storage area 420, or a work area on the client side connected through the network 304) in which the edition of the data content using an external program is possible. And, the process is once interrupted to wait for the completion of edition of the outputted data content by the external program (for example, an SGML editor). When a notice of completion of the edition processing by the external program is received, the process is restarted so that the flow goes to step 1205. In step 1205, the data content after updating is read from the external area and the data content of the update object entity is replaced by the read data content which is in turn stored into the document space database storage area 418.

Next or in step 1206, the partial relationship data generation processing unit 425 judges the type of the update object entity. In the case where the update object entity is a document entity or a text entity, steps 1207 and 1208 are carried out. In the other case or in the case where the update object entity is a non-SGML data entity, step 1209 is carried out.

In step 1207, the syntax analysis of the updated data content of the update object entity is made to generate syntax analysis result data which indicates an entity structure and parsed instance data of the update object entity. In step 1208, the reference to the syntax analysis result data is made to generate partial relationship data in which each entity forming the update object entity and a logical structure portion obtained by the parsed instance data are associated with each other.

In step 1209, the updated data content itself is set as the partial relationship data.

Next or in step 1210, the corresponding sub-region determination processing unit 426 searches the relationship data of all registered documents to detect all entity transition nodes which correspond to the update object entity (or hold the entity identifier of the update object entity). For all of the detected entity transition nodes, step 1211 is repeatedly carried out. In step 1211, the relationship data update processing unit 431 replaces partial relationship data at a position lower than the selected entity transition node by that partial relationship data set in step 1208 or step 1209 which is in turn stored into the document space database storage-area, thereby updating the relationship data of the registered document corresponding to the updated entity. Finally or in step 1212, the lock set for the update object entity is released. Thereby, the process is completed.

Figure 11:
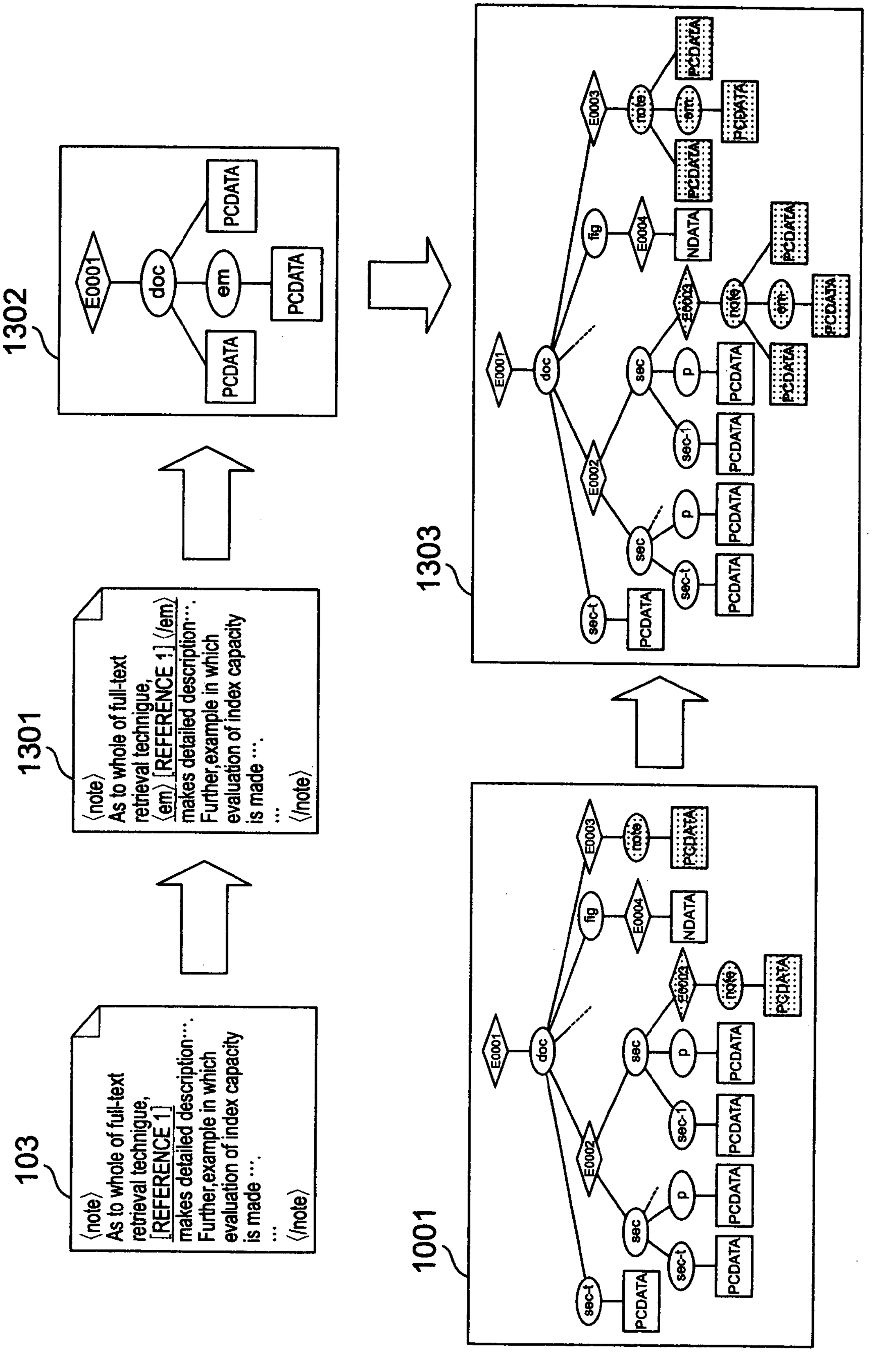
FIG. 11 is a diagram showing an example of progress of the processing for updating of the content of the selected entity in the embodiment.

FIG. 11 is a diagram showing an example of the progress of a process for updating of the content of a selected entity in the present embodiment. FIG. 11 represents a specific example of the progress of the updating of the content of the selected entity the procedure of which has been shown in FIG. 10. The example shown in FIG. 11 corresponds to the case where the content of the entity text 103 shown in FIG. 15 is outputted to an external area so that it is subjected to edition by an external program.

In the shown example, it is assumed that a part of a content character string included in an element "note", in the text entity 103 is enclosed by tags <em> and </em> so that it is changed into an independent element "em". With this edition processing, the content of the text entity 103 is updated as indicated by edition result entity data 1301. Since this entity is a text entity, syntax analysis is carried out in step 1207 shown in FIG. 10 and partial relationship data is generated in step 1208. In the case of the shown example, there results in that the generated relationship data has a structure indicated by relationship data 1302.

Next or in step 1210, a search is made for an entity transition node corresponding to the update object entity. In the example shown in FIG. 11, the registered document has the relationship data 1001 shown in FIG. 8. Therefore, two entity transition nodes (at upper extremes of shaded node in the relationship data 1001 shown in FIG. 11) corresponding to the updated text entity 103 (or the entity identifier E0003) are detected on this tree structure. Accordingly or in step 1211, the replacement of sub-structures having those entity transition nodes as roots is made so that the relationship data of the document is ultimately updated as indicated by relationship data 1303.

Figure 12:
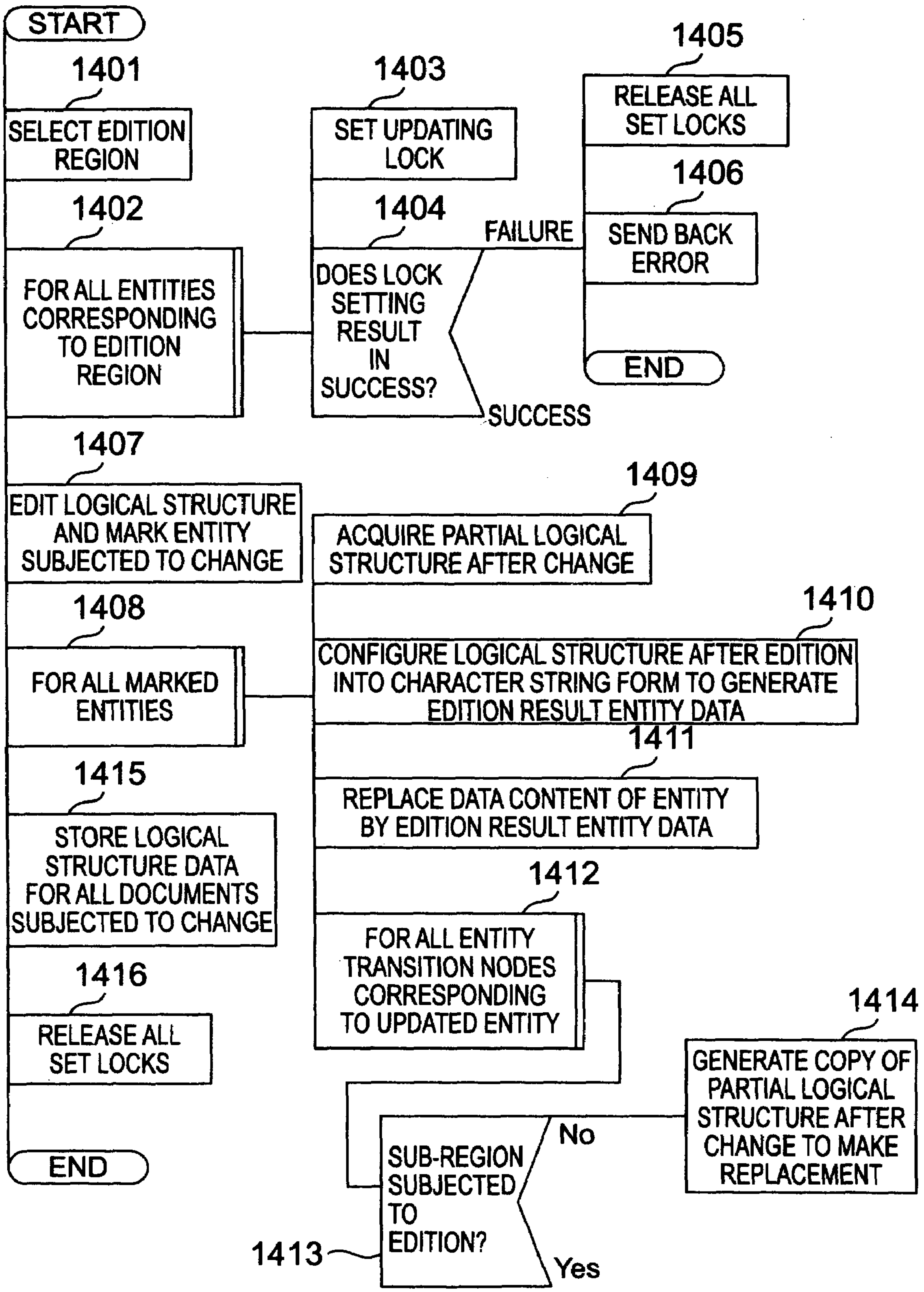
FIG. 12 is a PAD showing a procedure for updating of the logical structure of a selected document in the embodiment.

FIG. 12 is a PAD showing a procedure for updating the logical structure of a selected document in the present embodiment. The details of step 1105 in FIG. 9 or the processing for updating the relationship data of the selected document will now be described.

As shown in FIG. 12, the logical structure edition processing unit 427 for performing the updating of the logical structure of a selected document first selects an edition region (step 1401). The selection of the edition region is made by designating any node on the logical structure of relationship data of a document to be subjected to edition. Sub-trees having the designated node as a root form a region for which the edition is possible.

Next or in processings of steps 1402 to 1406, locks are set for all entities corresponding to the selected edition region in order to prevent the duplicate updating by a plurality of users. The entities corresponding to the selected region include entities which correspond to entity transition nodes included in the selected region and an entity transition node existing at a position upper than the selected region and nearest thereto.

In step 1403, an updating lock is set for a specified entity which is now under consideration. Next, the check is made of whether or not the lock setting results in a success (step 1404). In the case of a failure, all presently set locks are released and there is then sent back an error code indicating that an updating lock has already been set and the updating is therefore impossible (step 1406). Thereby, the process is completed.

In the case where the setting of locks for all the corresponding entities results in a success, the flow goes to step 1407. In step 1407, an editing operation for the logical structure of the relationship data (the addition/deletion of a lower node, the change of character string data, and so forth) is performed in accordance with a designation from a user through a GUI or the like. At this time, an entity including a position subjected to change or edition is applied with an update mark indicating that the entity has the changed content.

When the completion of the editing operation is indicated, the flow goes to step 1408. In step 1408, processings of steps 1409 to 1414 are repeated for all entities applied with the update marks in the stage of the editing operation.

In step 1409, the edition result data generation processing unit 428 acquires partial relationship data for a region corresponding to an entity which is now under consideration. The acquired partial relationship data is stored into a temporary storage. In step 1410, there is generated edition result entity data in which the partial relationship data acquired in step 1409 is described in a character string form in accordance with the syntax of the document markup language SGML. Next or in step 1411, the corresponding relationship data update processing unit 429 replaces the data content of the entity under consideration by the generated edition result entity data which is in turn stored into the document space database storage area 418.

In step 1412, the update object detection processing unit 430 searches the relationship data of all registered documents to detect all entity transition nodes which correspond to the updated entity under consideration (or hold the entity identifier of the entity under consideration). For all of the detected entity transition nodes, processings of steps 1413 and 1414 are repeatedly performed.

In step 1413, the relationship data update processing unit 431 judges whether or not an entity transition node under consideration is a node corresponding to a region having already been subjected to the edition of the logical structure in step 1407. In the case where the entity transition node under consideration is not such a node or has not yet been edited, a copy of the partial relationship data after updating acquired in step 1409 is generated and a sub-tree having the entity transition node under consideration as a root is replaced by the generated copy (step 1414).

When the repetition in step 1408 is completed, the flow goes to step 1415 in which the relationship data for all documents subjected to change is stored into the document space database storage area 418. Finally, the locks set for the entity group are all released (step 1416), thereby completing the process.

Figure 13:
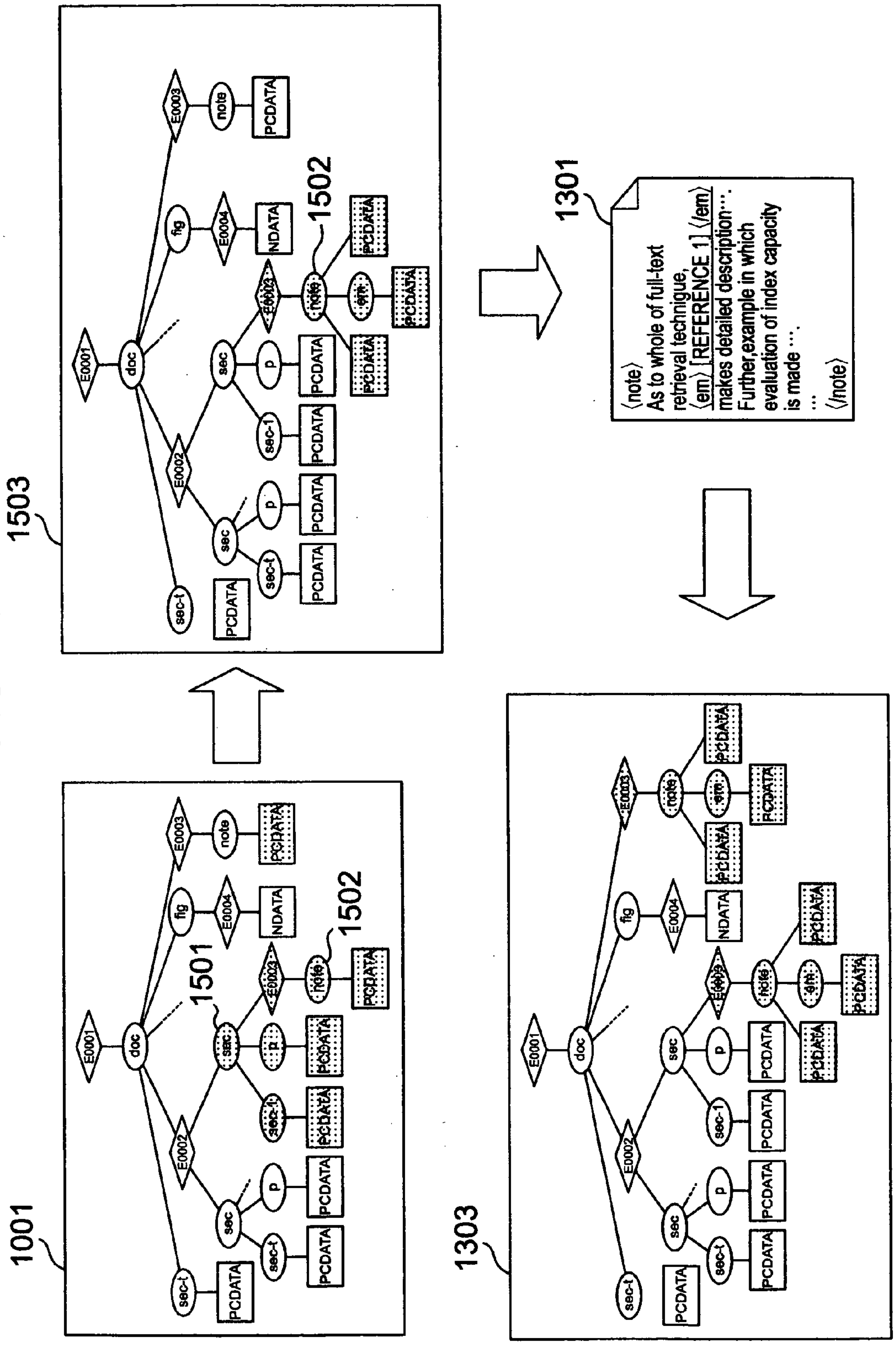
FIG. 13 is a diagram showing an example of progress of a processing for updating of the relationship data of a selected document in the embodiment.

FIG. 13 is a diagram showing an example of the progress of a process for updating of the relationship data of a selected document in the present embodiment. FIG. 13 represents a specific example of the progress of the updating of the relationship data of the selected document the procedure of which has been shown in FIG. 12. The example shown in FIG. 13 corresponds to the case where the relationship data of the SGML document shown in FIG. 15 is edited.

Relationship data 1001 shown in FIG. 13 corresponds to a logical structure before the edition is made. The relationship data 1001 is the same as the relationship data 1001 shown in FIG. 8. Now provided that the selection of an edition region is made by designating a "sec" type element 1501, sub-trees having the "sec" type element 1501 as a root form a region for which the edition is possible. As a result, an entity E0003 corresponding to an entity transition node included in the edition region and an entity E0002 corresponding to an entity transition node at a position upper than the edition region and nearest thereto are subjected to the setting of locks as entities corresponding to the edition region.

After the lock setting, an editing operation is performed. In the shown example, the structure edition is made in such a manner that parsed character string data existing at a position lower than a "note" type element 1502 is divided so that a part thereof forms an "em" type element. In this case, the logical structure of the whole document after updating results in relationship data 1503. Provided that only the above editing operation is ultimately performed, an entity applied with a mark as an entity subjected to content change is only E0003. Edition result entity data is generated from partial relationship data after updating by configuring it into a character string form in accordance with the syntax of the document markup language SGML. In the shown example, the same character string data 1301 as the edition result entity data 1301 shown in FIG. 11 is obtained as the edition result entity data.

After the entity E0003 is updated by replacing the data content thereof by the edition result entity data 1301, each of structures at positions lower than all entity transition nodes corresponding to the updated entity E0003 (but excluding the entity transition node included in the region subjected to structure edition) is replaced by a copy of the partial relationship data after structure edition. In the shown example, since another entity transition node corresponding to the entity E0003 is included in the document, the replacement of the structure of this portion is made. Ultimate relationship data 1303 after updating results in the same as the relationship data 1303 shown in FIG. 11.

As shown in the above, a document update processing in the present embodiment results in that whether an entity forming a document is edited as a text or the logical structure of the document is directly subjected to structure edition, the same result having a consistency or matching between the logical structure and the data content of the entity remains ultimately if the substantial content of edition is equivalent. Though the present embodiment has been described in the case where a structured document described by use of SGML is processed as a document made an object of registration, a structured document described by use of another document markup language such as XML, HTML or the like may be made the object of registration.

Figure 14:
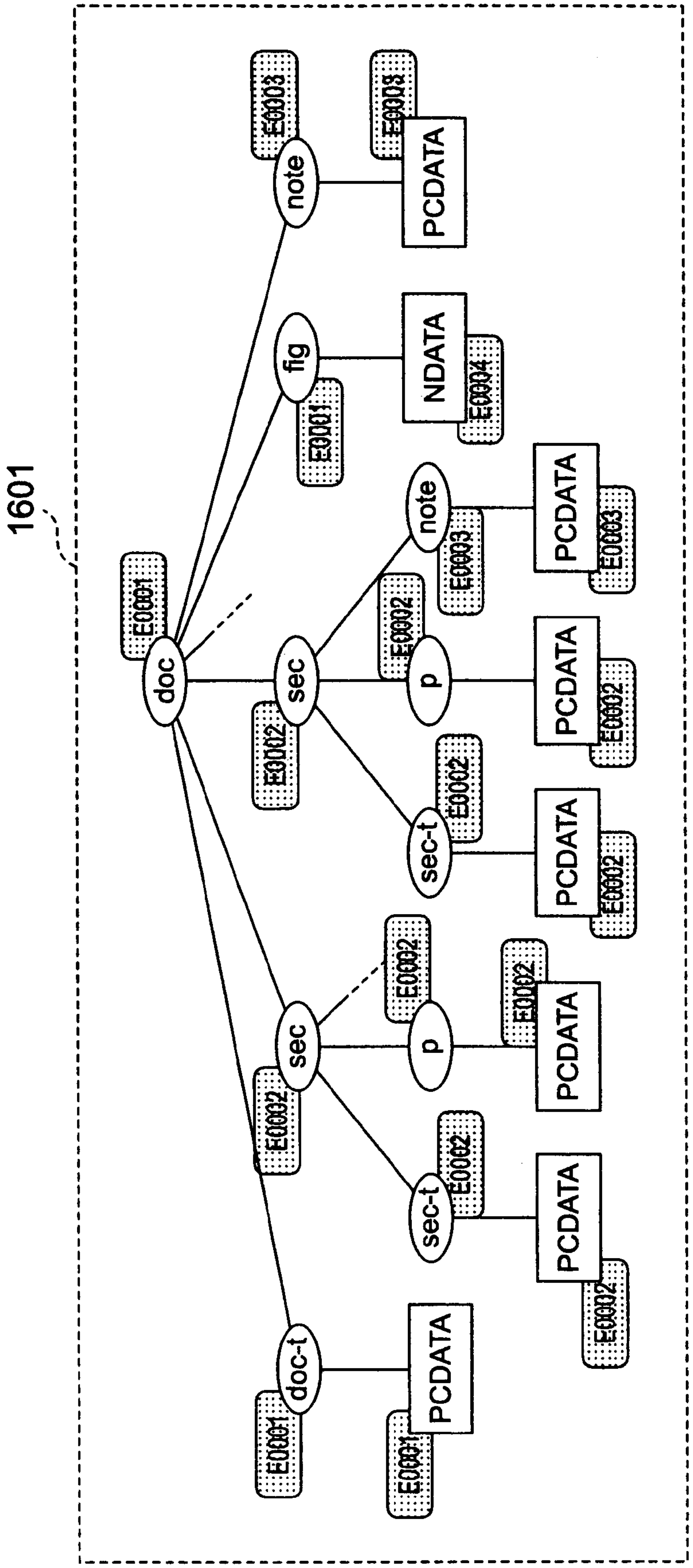
FIG. 14 is a diagram showing another example of the data structure of relationship data generated by the document registration control program in the embodiment.

FIG. 14 is a diagram showing another data structure of relationship data generated by the document registration control program 410 in the present embodiment. FIG. 14 shows, by way of example, relationship data generated in the case where the SGML document shown in FIG. 15 is processed as a document made an object of registration. This other example of relationship data in the present embodiment will now be described.

As shown in FIG. 14, relationship data 1601 does not include entity transition nodes in the tree structure, unlike the relationship data 1001 shown in FIG. 8. In the relationship data 1601, an entity transition node is not held as an independent node. There instead, individual element nodes and data content nodes forming the logical structure hold the entity identifiers of the corresponding entities as properties.

Since all the element nodes and the data content nodes have the entity identifiers, the data amount of the relationship data 1601 is large as compared with that of the relationship data 1001 shown in FIG. 8. However, when an entity corresponding to an edition region is to be determined in the processing for updating of the logical structure of the selected document shown in FIG. 12, a need to search for entity transition nodes with the upward tracing of the tree structure of nodes is eliminated but the acquisition of entity identifiers held as properties by nodes included in the edition region suffices, thereby simplifying the processing and improving the efficiency of processing. No functional difference is caused between the case where the relationship data 1601 is used and the case where the relationship data 1001 is used.

According to the structured document managing system in the present embodiment as described above, relationship data indicating each entity forming a document made an object of registration and a logical structure portion corresponding to that entity is generated to manage a plurality of entities. Therefore, the management of a registered document can be made with a logical structure and an entity structure of the document associated with each other in a mutually convertible form.

According to the structured document managing system in the present embodiment, an attribute originally possessed by an entity forming a registered document is taken over. Therefore, it is possible to make the control of access to each entity of the registered document without making the manual setting of attribute, that is, in accordance with the attribute possessed by each entity of a structured document before registration.

According to the structured document managing system in the present embodiment, the processing of a registered document is performed while partially taking out the document in units of an entity. Therefore, it is possible to reduce the amount of data transferred at the time of entity taking-out, thereby improving the efficiency of processing.

According to the structured document managing system in the present embodiment, the edition is made while separately taking out a plurality of objects of edition from a registered document in units of an entity. Therefore, it is possible to easily make the co-operative management and allotted writing of a large scale document by a plurality of persons in charge.

According to the structured document managing system in the present embodiment, there is no fear that text data in units of an entity is lost. Therefore, it is possible to make the strict management of a document with digital signature data applied for each entity forming the document in order to ensure the content and generator (or creator) of that entity.

According to the present invention, since relationship data indicating each entity forming a document made an object of registration and a logical structure portion corresponding to that entity is generated to manage a plurality of entities, it is possible to manage a logical structure and an entity structure of a registered document in such a manner that they are associated with each other in a mutually convertible form.

The invention claimed is:

1. A computer implemented structured document managing method for managing a structured document described by use of a document markup language, comprising:

an entity reference information adding step in which when a document is registered, syntax analysis is made on the content of the document to extract all of entity reference information included in said document, an entity reference node is inserted into a tree structure of an analyzed document logical structure by using the extracted entity reference information, said entity reference node referring to a file including contents of a group of lower position nodes as a text of said document markup language;

a data content updating step in which an arbitrary entity reference node is selected from the tree structure of the document logical structure, a file indicated by said entity reference node is selected as an object of updating, and a content text of the selected file made object of updating is updated;

a partial logical structure generating step in which syntax analysis is made on the content text of the updated file, and a partial logical structure corresponding to said content text is generated; and a document logical structure updating step in which all of the entity reference nodes referring to said file made object of updating are detected among the entity reference nodes included in the tree structure of said document logical structure, and the group of nodes in lower position of the detected entity reference nodes is replaced by said partial logical structure generated in said partial logical structure generating step.

2. A computer implemented structured document managing method for managing a structured document described by use of a document markup language, comprising:

an entity reference information adding step in which when a document is registered, syntax analysis is made on the content of the document to extract all of entity reference information included in said document, an entity reference node is inserted into a tree structure of an analyzed document logical structure by using the extracted entity reference information, said entity reference node referring to a file including contents of a group of lower position nodes as a text of said document markup language;

a logical structure editing step of selecting an arbitrary partial logical structure as an object to be updated in the logical structure of the registered document, and editing said partial logical structure;

an edition result data generating step of referring to the entity reference node included in said logical structure of the document, detecting a group of files affected by the edited partial logical structure, and for each detected file generating a text in said document markup language which is a content after the update;

a corresponding data content updating step of replacing the data content of said file by the generated edition result data; and a document logical structure updating step in which all of the entity reference nodes referring to said file made object of updating are detected among the entity reference nodes included in the tree structure of said document logical structure, and the group of nodes in lower position of the detected entity reference nodes is replaced by said partial logical structure updated in said logical structure editing step.

3. A computer implemented structured document managing method for managing a structured document described by use of a document markup language, comprising:

an entity reference information adding step in which when a document is registered, syntax analysis is made on the content of the document to extract all of entity reference information included in said document, an entity reference attribute is inserted into each node of a tree structure of an analyzed document logical structure by using the extracted entity reference information, said entity reference attribute referring to a file including the contents as a text of said document markup language;

a data content updating step in which an arbitrary node is selected from the tree structure of the document logical structure, a file indicated by the entity reference attribute of said node is selected as an object of updating, and a content text of the selected file made object of updating is updated;

a partial logical structure generating step in which syntax analysis is made on the content text of the updated file, and a partial logical structure corresponding to said content text is generated; and a document logical structure updating step in which in the tree structure of said document logical structure, all of the nodes at the highest position among a group of nodes having the entity reference attribute and referring to the updated file are detected, and the group of nodes in lower position than the position of said detected node is replaced by said partial logical structure generated in said partial logical structure generating step.

4. A computer implemented structured document managing method for managing a structured document described by use of a document markup language, comprising:

an entity reference information adding step in which when a document is registered, syntax analysis is made on the content of the document to extract all of entity reference information included in said document, an entity reference attribute is inserted into each node of a tree structure of an analyzed document logical structure by using the extracted entity reference information, said entity reference attribute referring to a file including the contents as a text of said document markup language;

a logical structure editing step of selecting an arbitrary partial logical structure as an object to be updated in the logical structure of the registered document, and editing said partial logical structure;

an edition result data generating step of referring to the entity reference attribute included in said logical structure of the document, detecting a group of files affected by the edited partial logical structure, and for each detected file generating a text in said document markup language which is a content after the update;

a corresponding data content updating step of replacing the data content of said file by the generated edition result data; and a document logical structure updating step in which all of the nodes at the highest position having the entity reference attribute and referring to the updated file are detected among the nodes included in the tree structure of said document logical structure, and the group of nodes in lower position than the position of said detected node is replaced by said partial logical structure updated in said logical structure editing step.

* * * * *